(12) United States Patent
Zelenko et al.

(10) Patent No.: US 8,943,002 B2
(45) Date of Patent: Jan. 27, 2015

(54) ANALYTICS DRIVEN ENGAGEMENT

(75) Inventors: Avinoam Zelenko, Ra'anana (IL); Vitaly Gordon, Bnei Zion (IL); Arnon-Naftally Kehat, Zoran (IL); Matan Barak, Ra'anana (IL)

(73) Assignee: Liveperson, Inc., New York, NY (US)

( * ) Notice: Subject to any disclaimer, the term of this patent is extended or adjusted under 35 U.S.C. 154(b) by 62 days.

(21) Appl. No.: 13/413,158

(22) Filed: Mar. 6, 2012

(65) Prior Publication Data

US 2013/0212497 A1    Aug. 15, 2013

Related U.S. Application Data

(60) Provisional application No. 61/632,815, filed on Feb. 10, 2012.

(51) Int. Cl.
   *G06F 15/18*    (2006.01)
(52) U.S. Cl.
   USPC ........................................................ 706/12
(58) Field of Classification Search
   USPC ........................................................ 706/12
   See application file for complete search history.

(56) References Cited

U.S. PATENT DOCUMENTS

| | | |
|---|---|---|
| 4,881,261 A | 11/1989 | Oliphant et al. |
| 5,187,735 A | 2/1993 | Herrero Garcia et al. |
| 5,206,903 A | 4/1993 | Kohler et al. |
| 5,208,748 A | 5/1993 | Flores et al. |
| 5,235,519 A | 8/1993 | Miura |
| 5,239,462 A | 8/1993 | Jones et al. |
| 5,262,941 A | 11/1993 | Saladin et al. |
| 5,289,371 A | 2/1994 | Abel et al. |
| 5,319,542 A | 6/1994 | King et al. |
| 5,351,186 A | 9/1994 | Bullock et al. |
| 5,372,507 A | 12/1994 | Goleh |

(Continued)

FOREIGN PATENT DOCUMENTS

| | | |
|---|---|---|
| EP | 840244 A1 | 5/1998 |
| EP | 1233361 A1 | 8/2002 |

(Continued)

OTHER PUBLICATIONS

Chartrand Sabra, "A new system seeks to ease the bottleneck in the customer-service information highway," The New York Times (Apr. 30, 2001), 2 pages.

(Continued)

*Primary Examiner* — Kakali Chaki
*Assistant Examiner* — Ababacar Seck
(74) *Attorney, Agent, or Firm* — Kilpatrick Townsend & Stockton LLP

(57) ABSTRACT

Various embodiments relate to an engagement server and a related method of initiating an engagement between an agent device and a user device based on formed and modified engagement rules. In one embodiment, the engagement server can receive one or more third-party analytic reports and use them to form engagement rules that determine when the engagement server initiates an engagement between the agent device and user device. In some embodiments, the engagement server can also receive user interaction data from the user device to modify engagement rules to fit a particular user. In some embodiments, the engagement server can use the third-party analytic reports and/or user interaction data from a plurality of users to form a statistical model. The engagement server may then use the statistical model to form and/or modify the engagement rules.

18 Claims, 3 Drawing Sheets

(56) References Cited

U.S. PATENT DOCUMENTS

| | | |
|---|---|---|
| 5,375,055 A | 12/1994 | Togher et al. |
| 5,387,783 A | 2/1995 | Mihm et al. |
| 5,450,537 A | 9/1995 | Hirai et al. |
| 5,517,405 A | 5/1996 | McAndrew et al. |
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenrich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,428 A | 5/2000 | Wang et al. |
| 6,061,658 A | 5/2000 | Chou et al. |
| 6,064,987 A | 5/2000 | Walker et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |

(56) References Cited

U.S. PATENT DOCUMENTS

| | | |
|---|---|---|
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin et al. |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shafiee et al. |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,850,896 B1 | 2/2005 | Kelman et al. |
| 6,865,267 B2 | 3/2005 | Dezono |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,958,066 B2 | 6/2011 | Pinckney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,185,544 B2 | 5/2012 | Oztekin et al. |
| 8,260,846 B2 | 9/2012 | Lahav |
| 8,266,127 B2 | 9/2012 | Mattox et al. |
| 8,386,340 B1 | 2/2013 | Feinstein |
| 8,392,580 B2 | 3/2013 | Allen et al. |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |

(56) References Cited

U.S. PATENT DOCUMENTS

| | | |
|---|---|---|
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McElfresh et al. |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0091832 A1 | 7/2002 | Low et al. |
| 2002/0107728 A1 | 8/2002 | Bailey et al. |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161664 A1 | 10/2002 | Shaya et al. |
| 2002/0167539 A1 | 11/2002 | Brown et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2004/0034567 A1 | 2/2004 | Gravett |
| 2004/0064412 A1 | 4/2004 | Phillips et al. |
| 2004/0088323 A1 | 5/2004 | Elder et al. |
| 2004/0128390 A1 | 7/2004 | Blakley et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0096997 A1 | 5/2005 | Jain et al. |
| 2005/0114195 A1 | 5/2005 | Bernasconi |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0216342 A1 | 9/2005 | Ashbaugh |
| 2005/0256955 A1 | 11/2005 | Bodwell et al. |
| 2005/0262065 A1 | 11/2005 | Barth et al. |
| 2005/0288943 A1 | 12/2005 | Wei et al. |
| 2006/0015390 A1 | 1/2006 | Rijsinghani et al. |
| 2006/0021009 A1 | 1/2006 | Lunt |
| 2006/0026237 A1 | 2/2006 | Wang et al. |
| 2006/0041476 A1 | 2/2006 | Zheng |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0239527 A1 | 10/2007 | Nazer et al. |
| 2007/0250585 A1 | 10/2007 | Ly et al. |
| 2007/0260596 A1 | 11/2007 | Koran et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0147480 A1 | 6/2008 | Sarma et al. |
| 2008/0147741 A1 | 6/2008 | Gonen et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0055267 A1 | 2/2009 | Roker |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0138606 A1 | 5/2009 | Moran et al. |
| 2009/0164171 A1* | 6/2009 | Wold et al. ............ 702/179 |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0307003 A1 | 12/2009 | Benyamin et al. |
| 2009/0319296 A1 | 12/2009 | Schoenberg |
| 2010/0023475 A1 | 1/2010 | Lahav |
| 2010/0023581 A1 | 1/2010 | Lahav |
| 2010/0049602 A1 | 2/2010 | Softky |
| 2010/0106552 A1 | 4/2010 | Barillaud |
| 2010/0110933 A1 | 5/2010 | Wilcock |
| 2010/0205024 A1 | 8/2010 | Shachar et al. |
| 2010/0255812 A1 | 10/2010 | Nanjundaiah et al. |
| 2010/0281008 A1* | 11/2010 | Braunwarth ............ 707/705 |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246406 A1 | 10/2011 | Lahav et al. |
| 2011/0270926 A1 | 11/2011 | Boyd |
| 2011/0271175 A1 | 11/2011 | Lavi et al. |
| 2011/0307331 A1* | 12/2011 | Richard et al. ............ 705/14.45 |
| 2011/0320715 A1 | 12/2011 | Ickman et al. |
| 2012/0042389 A1 | 2/2012 | Bradley et al. |

(56) References Cited

U.S. PATENT DOCUMENTS

| | | |
|---|---|---|
| 2012/0059722 A1 | 3/2012 | Rao |
| 2012/0136939 A1 | 5/2012 | Stern et al. |
| 2012/0150973 A1 | 6/2012 | Barak |
| 2012/0323346 A1 | 12/2012 | Ashby et al. |
| 2013/0013362 A1 | 1/2013 | Walker et al. |
| 2013/0036202 A1 | 2/2013 | Lahav |
| 2013/0132194 A1 | 5/2013 | Rajaram |
| 2013/0182834 A1 | 7/2013 | Lauffer |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |

FOREIGN PATENT DOCUMENTS

| | | |
|---|---|---|
| EP | 1 276 064 A2 | 1/2003 |
| EP | 1 549 025 A1 | 6/2005 |
| EP | 1 840 803 A1 | 10/2007 |
| EP | 1 845 436 A2 | 10/2007 |
| EP | 1 850 284 A1 | 10/2007 |
| FR | 2 950 214 A1 | 3/2011 |
| JP | 9288453 A2 | 11/1997 |
| JP | 2004-054533 | 2/2004 |
| KR | 20040110399 A | 12/2004 |
| KR | 20050010487 A | 1/2005 |
| KR | 20080046310 A | 5/2008 |
| KR | 20080097751 A | 11/2008 |
| WF | 0127825 A1 | 4/2001 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 01/35272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/158830 A1 | 10/2013 |
| WO | 2013/163426 A1 | 10/2013 |

OTHER PUBLICATIONS

Just Answer (2004 Faq) Archive.org cache of www.justanswer.com circa (Dec. 2004), 8 pages.
Pack Thomas, "Human Search Engines the next Killer app," (Dec. 1, 2000) Econtent DBS vol. 23; Issue 6, 7 pages.
Match.Com "Match.com Launches Match.com Advisors," PR Newswire (Oct. 14, 2003), 2 pages.
Sitel, "Sitel to Provide Live Agent Support Online for Expertcity. com," PR Newswire (Feb. 28, 2000), 2 pages.
Webmaster World, "Link to my website is in a frame with banner ad at the top," www.webmasterworld.com (Nov. 11, 2003), 2 pages.
Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
Fairisaac, "How SmartForms for Blaze Advisor Works," www. fairisaac.com 12 pages (Jan. 2005).
Mesbah A et al., "A Component-and Push-Based Architectural Style for Ajax Applications," The Journal of Systems & Software, 81 (12): pp. 2194-2209, Elsevier North Holland, New York, NY US (Dec. 2008).
Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.
"OAuth core 1.0 Revision A [XP002570263]," OAuth Core Workgroups, pp. 1-27 www.ouath.net/core/1.0a/ (retrieved Jan. 31, 2013), 24 pages.
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, the," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
redhat__.com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog__ File 621: New Product Announcement, 3 pages.
Handley, John, "Credit Review Lets the Numbers Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.

(56) References Cited

OTHER PUBLICATIONS

"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards-and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n. 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, the First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.

FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-_inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action issued Oct. 8, 2008, 14 pages.
"Sample Experian Credit Report" by Consumer Information consumerinfo.com (Jul. 9, 1998) 4 pages.
Plaintiffs Original Complaint, *Nextcard, LLC* v. *Liveperson, Inc.*; Civil Action No. 2:08-cv-00184-TJW, in the U.S. District Court for the Eastern District of Texas, Marshall Division, filed Apr. 30, 2008 (7 pages).
Amended Complaint and Jury Demand; *Liveperson, Inc.* v. *Nextcard, LLC, et al.*; Civil Action No. 08-062 (GMS), in the U.S. District Court for the District of Delaware, filed Mar. 18, 2008 (5 pages).
Plaintiffs Second Amended Complaint; *Nextcard, LLC* v. *American Express Company, et al*; Civil Action No. 2:07-cv-354 (TJW); in the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; *Nextcard, LLC* v. *American Express Company, et al*; Civil Action No. 2:07-cv-354 (TJW); in the U.S. District Court for the Eastern District of Texas, Marshall Division filed (Apr. 28, 2008), 13 pages.
Answer and Counterclaims of Defendant DFS Services LLC; *Nextcard, LLC* v. *American Express Company, et al*; Civil Action No. 2:07-cv-354 (TJW); in the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; *Nextcard, LLC* v. *American Express Company, et al*; Civil Action No. 2:07-cv-354 (TJW); in the U.S. District Court for the Eastern District of Texas, Marshall Division, filed Apr. 28 2008, 10 pages.
Plaintiffs Second Amended Reply to Counterclaims of Defendants HSBC North America Holdings Inc. and HSBC USA Inc.; *Nextcard, LLC* v. *American Express Company, et al*; Civil Action No. 2:07-cv-354 (TJW); in the U.S. District Court for the Eastern District of Texas, Marshall Division, filed May 14, 2008, 5 pages.
Plaintiffs Second Amended Reply to Counterclaims of Defendant DFS Services LLC; *Nextcard, LLC* v. *American Express Company, et al*; Civil Action No. 2:07-cv-354 (TJW); in the U.S. District Court for the Eastern District of Texas, Marshall Division, filed May 14, 2008 (71 pages).
Plaintiffs Second Amended Reply to Counterclaims of Defendant American Express Company; *Nextcard, LLC* v. *American Express Company, et al*; Civil Action No. 2:07-cv-354 (TJW); in the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc.," PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.

(56) References Cited

OTHER PUBLICATIONS

Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click-Through Rate for New Ads," (May 2007) 9 pages.
"Welcome to Keen" retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" SEARCHER, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (Mar. 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
International Search Report and Written Opinion for PCT Application No. PCT/US2013/041147, mailed Jul. 30, 2013, 9 pages.
International Search Report and Written Opinion for PCT Application No. PCT/US2013/037086, mailed Jul. 12, 2013, 9 pages.
International Search Report and Written Opinion for PCT Application No. PCT/US2013/29389, mailed Jul. 24, 2013, 8 pages.
International Search Report and Written Opinion for PCT Application No. PCT/US2013/038212, mailed Jul. 17, 2013, 11 pages.
International Search Report for PCT Application No. PCT/US03/41090, mailed on Sep. 1, 2004, 3 pages.
International Search Report for PCT Application No. PCT/US05/40012, mailed on Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, mailed on Jul. 7, 2011, 3 pages.
International Search Report for PCT Application No. PCT/US2011/064946, mailed on Jun. 22, 2012, 3 pages.
International Preliminary Report on Patentability for PCT Application No. PCT/US2011/031239, dated Oct. 9, 2012, 8 pages.
Non-Final Office Action of Dec. 11, 2008 for U.S. Appl. No. 11/394,078, 15 pages.
Final Office Action of Jul. 9, 2009 for U.S. Appl. No. 11/394,078, 15 pages.
Non-Final Office Action of Jan. 28, 2010 for U.S. Appl. No. 11/394,078, 14 pages.
Final Office Action of Jul. 9, 2010 for U.S. Appl. No. 11/394,078, 16 pages.
Non-Final Office Action of Feb. 1, 2011 for U.S. Appl. No. 11/394,078, 20 pages.
Final Office Action of Aug. 2, 2011 for U.S. Appl. No. 11/394,078, 23 pages.
Non-Final Office Action of May 16, 2012 for U.S. Appl. No. 11/394,078, 23 pages.
Final Office Action of Jan. 25, 2013 for U.S. Appl. No. 11/394,078, 22 pages.
Non-Final Office Action of Jun. 22, 2012 for U.S. Appl. No. 13/080,324, 9 pages.
Non-Final Office Action of Aug. 15, 2012 for U.S. Appl. No. 12/967,782, 31 pages.
Non-Final Office Action of Jul. 29, 2011 for U.S. Appl. No. 12/608,117, 20 pages.
Final Office Action of Apr. 4, 2012 for U.S. Appl. No. 12/608,117, 25 pages.
Non-Final Office Action of Apr. 24, 2004 for U.S. Appl. No. 09/922,753, 16 pages.
Final Office Action of Oct. 14, 2004 for U.S. Appl. No. 09/922,753, 13 pages.
Non-Final Office Action of May 17, 2005 for U.S. Appl. No. 09/922,753, 13 pages.
Non-Final Office Action of Mar. 14, 2006 for U.S. Appl. No. 09/922,753, 13 pages.
Final Office Action of Jul. 26, 2006 for U.S. Appl. No. 09/922,753, 13 pages.
Non-Final Office Action of Aug. 13, 2008 for U.S. Appl. No. 09/922,753, 10 pages.
Final Office Action of Apr. 23, 2009 for U.S. Appl. No. 09/922,753, 11 pages.
Non-Final Office Action of Jul. 21, 2009 for U.S. Appl. No. 09/922,753, 10 pages.
Final Office Action of Feb. 18, 2010 for U.S. Appl. No. 09/922,753, 9 pages.
Non-Final Office Action of Apr. 25, 2011 for U.S. Appl. No. 09/922,753, 9 pages.
Final Office Action of Nov. 25, 2011 for U.S. Appl. No. 09/922,753, 10 pages.
Non-Final Office Action of Aug. 7, 2007 for U.S. Appl. No. 10/980,613, 16 pages.
Non-Final Office Action of May 15, 2008 for U.S. Appl. No. 10/980,613, 23 pages.
Non-Final Office Action of Apr. 30, 2012 for U.S. Appl. No. 12/504,265, 16 pages.
Final Office Action of Aug. 28, 2012 for U.S. Appl. No. 12/504,265, 28 pages.
Final Office Action of Feb. 14, 2013 for U.S. Appl. No. 13/080,324, 11 pages.
Non-Final Office Action of Mar. 30, 2013 for U.S. Appl. No. 11/360,530, 23 pages.
Final Office Action of Apr. 11, 2013 for U.S. Appl. No. 12/967,782, 18 pages.
Non-Final Office Action of May 10, 2013 for U.S. Appl. No. 13/563,708, 20 pages.

(56) References Cited

OTHER PUBLICATIONS

Non-Final Office Action of Jun. 12, 2013 for U.S. Appl. No. 12/608,117, 56 pages.
Non-Final Office Action of Jun. 20, 2013 for U.S. Appl. No. 13/157,936, 19 pages.
Non-Final Office Action of Jun. 27, 2013 for U.S. Appl. No. 12/504,265, 11 pages.
Non-Final Office Action of Jul. 8, 2013 for U.S. Appl. No. 13/413,197, 10 pages.
Final Office Action of Oct. 21, 2013 for U.S. Appl. No. 12/504,265 14 pages.
Non-Final Office Action of Oct. 30, 2013 for U.S. Appl. No. 13/961,072, 10 pages.
Non-Final Office Action of Dec. 5, 2013 for U.S. Appl. No. 12/967,782, 14 pages.
Notice of Allowance of Jan. 3, 2014 for U.S. Appl. No. 11/360,530, 29 pages.
Final Office Action of Jan. 22, 2014 for U.S. Appl. No. 12/608,117, 45 pages.
Final Office Action of Jan. 27, 2014 for U.S. Appl. No. 13/563,708, 35 pages.
Notice of Allowance of Feb. 12, 2014 for U.S. Appl. No. 13/157,936, 33 pages.
Final Office Action of Feb. 19, 2014 for U.S. Appl. No. 13/961,072, 35 pages.
Non-Final Office Action of Feb. 20, 2014 for U.S. Appl. No. 10/980,613, 43 pages.
Notice of Allowance of Feb. 28, 2014 for U.S. Appl. No. 09/922,753, 13 pages.
Notice of Allowance of Mar. 25, 2014 for U.S. Appl. No. 12/504,265, 31 pages.
Notice of Allowance of Mar. 31, 2014 for U.S. Appl. No. 12/725,999, 41 pages.
Notice of Allowance of Apr. 1, 2014 for U.S. Appl. No. 13/413,197, 32 pages.
International Preliminary Report on Patentability for PCT Application No. PCT/US2013/29389, mailed Sep. 18, 2014, 6 pages.
International Preliminary Report on Patentability for PCT Application No. PCT/US2013/025142, mailed Aug. 21, 2014, 5 pages.
Non-Final Office Action of Jul. 17, 2014 for U.S. Appl. No. 11/394,078, 16 pages.
Non-Final Office Action of Jul. 31, 2014 for U.S. Appl. No. 13/080,324, 17 pages.
Notice of Allowance of Aug. 18, 2014 for U.S. Appl. No. 12/967,782, 17 pages.
Non-Final Office Action of Aug. 21, 2014 for U.S. Appl. No. 10/980,613, 17 pages.
Notice of Allowance of Sep. 26, 2014 for U.S. Appl. No. 13/563,708, 8 pages.

* cited by examiner

US 8,943,002 B2

ANALYTICS DRIVEN ENGAGEMENT

CROSS-REFERENCE TO RELATED APPLICATIONS

This application claims the benefit of and priority under 35 U.S.C. §119(e) to U.S. Provisional Application No. 61/632,815, filed on Feb. 10, 2012, entitled "Analytic Driven Engagement," the entire disclosure of which is incorporated herein by reference in its entirety.

TECHNICAL FIELD

Various exemplary embodiments disclosed herein relate generally to methods executed on a computer and computer-based apparatus, including computer program products, for an analytic driven engagement.

BACKGROUND

A company can use its website in a variety of ways to communicate information to its customers. For example, a company can configure its website to provide information to a customer before the customer makes a purchasing decision. In other instances, the company can directly provide its products and/or services to its customers through its website, provide customer service through a support network, and/or gather specific information about its potential customers.

In order to implement such a wide array of services (which customers in this day and age have come to expect from Internet companies), many companies must employ large, robust websites and maintain large web presences. One consequence of creating such large and complex websites is that customers many not readily find the information or service they desire. For example, a customer may navigate to a desired location (e.g., web page) on a company's website, yet many not know the appropriate next steps to take once he or she reaches the desired location (e.g., how to complete a purchase transaction, how to compare a displayed product with other products, etc.). It is often difficult to determine when to engage a user of a website (e.g., to provide online chat help, to send coupons, to send advertisements, etc.).

SUMMARY

The methods and apparatus disclosed herein allow a website to engage website users (or to offer engagement to users) when the users may want or need help (e.g., to offer online chat with customer service agents, to provide coupons, etc.). Actions or other properties associated with the user's interaction with the website can be used to decide when the website should engage with a customer (e.g., offered help).

A brief summary of various exemplary embodiments is presented. Some simplifications and omissions may be made in the following summary, which is intended to highlight and introduce some aspects of the various exemplary embodiments, but not limit the scope of the invention. Detailed descriptions of a preferred exemplary embodiment adequate to allow those of ordinary skill in the art to make and use the inventive concepts will follow in the later sections.

In one embodiment, a computerized method for automatically adjusting engagement rules based on user interaction with a website is featured. The method includes a server computer storing a set of engagement rules for a website, wherein each engagement rule defines criteria that, if met, causes the website to engage a user of the website. The method includes the server computer receiving data indicative of a set of users' interactions with the website, wherein the data is generated by a third-party data provider. The method also includes automatically the server computer adjusting one or more generated rules from the set of engagement rules based on the received data.

In another embodiment, a computer program product, tangibly embodied in a non-transitory computer readable medium is featured. The computer program product includes instructions being configured to cause a data processing apparatus to store a set of engagement rules for a website, wherein each engagement rule defines criteria that, if met, causes the website to engage a user of the website. The computer program product includes instructions being configured to cause a data processing apparatus to receive data indicative of a set of users' interactions with the website, wherein the data is generated by a third-party data provider. The computer program product includes instructions being configured to cause a data processing apparatus to automatically adjust one or more generated rules from the set of engagement rules based on the received data.

In another embodiment, an apparatus for automatically adjusting engagement rules based on user interactions with a website is featured. The apparatus comprises a processor and memory. The apparatus is configured to store a set of engagement rules for a website, wherein each engagement rule defines criteria that, if met, causes the website to engage a user of the website. The apparatus is configured receive data indicative of a set of users' interactions with the website, wherein the data is generated by a third-party data provider. The apparatus is configured to automatically adjust one or more generated rules from the set of engagement rules based on the received data.

In other examples, any of the aspects above include one or more of the following features. In some examples, the server computer receives second data indicative of a second set of users' interactions with the website, wherein the second data is generated by a second third-party data provider that is different than the third-party data provider. In some examples, the server computer generates a statistical model based on the received data and the second received data. The received data and the second received data can each comprise one or more parameters. Generating the statistical model can comprise correlating a first parameter from the received data and a second parameter from the second received data using a principal component analysis (PCA).

In some examples, the statistical model can be indicative of user interaction with the website. The received data can comprise a website analytic report. Engaging a user can comprise transmitting a pop-up window to the user. Automatically adjusting can comprise creating a new engagement rule in the set of engagement rules. Automatically adjusting can comprise changing an existing engagement rule in the set of engagement rules.

It should be apparent that, in this manner, various exemplary embodiments enable dynamic engagement between an agent and a user on a website (or other user engagements, such as providing targeted advertisements, providing coupons, etc.). Particularly, by using analytical reports and modeling an agent can engage a user under predefined conditions, which can result in a more meaningful engagement between the agent and user.

The techniques, which include both methods and apparatuses, described herein can provide one or more of the following advantages. The incorporation of one or more third-party analytic tools and analytic reports allows the system to determine when to engage a user (e.g., based on robust statistics) that will more likely result in a successful engagement (e.g., a helpful engagement to the user, an engagement that promotes the sale of products or services, etc.) between agent and user. Automatically integrating such analytic tools with the rest of the engagement system eliminates the need for manual creation and maintenance of engagement rules that define the criterion(s) for when the system engages a user. Other aspects and advantages of the embodiments will become apparent from the following detailed description, taken in conjunction with the accompanying drawings, illustrating the principles of the invention by way of example only.

BRIEF DESCRIPTION OF THE DRAWINGS

In order to better understand various exemplary embodiments, reference is made to the accompanying drawings wherein.

DETAILED DESCRIPTION

Figure 1:
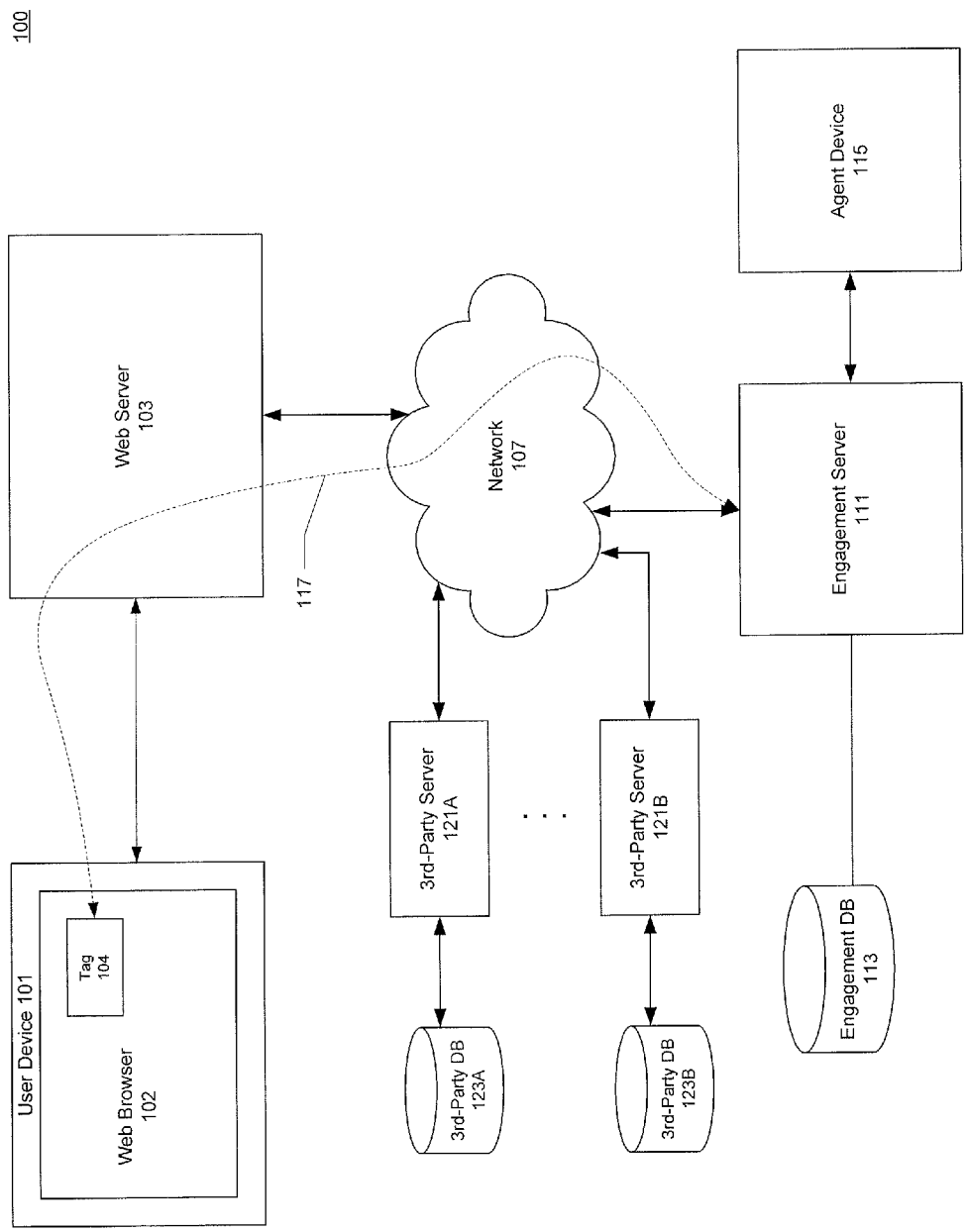
FIG. 1 illustrates an exemplary analytic-driven engagement system.

Referring now to the drawings, in which like numerals refer to like components or steps, there are disclosed broad aspects of various exemplary embodiments.

In general overview, computerized systems and methods are provided for an analytic-driven engagement system that initiates engagement with a user (e.g., engagement between a customer service agent and the user) based on, at least, analytic reports and/or analytic tools. The analytic reports and tools can be produced both internally and can be received from a third party. An engagement can include, for example, direct communications between an agent and a user (e.g., online text chat, voice chat, video chat, etc.). An engagement can also include other forms of action based on a user's interaction with the website. For example, a user can be presented with instructional text or video (e.g., that is automatically-generated based on the user's actions taken at the website), coupons (e.g., for products offered on the website and/or for products related to the website content), articles, community-created content, social media content (e.g., Facebook, Twitter), etc. An engagement server can monitor a user's activities when connected to a website or webpage. The engagement server, using engagement rules dynamically formed from at least the analytic tools, waits until the engagement rules are satisfied before engaging the user. In some embodiments, the engagement server can form the engagement rules from other users' activity data. In some embodiments, the engagement server can initiate the engagement between an agent and the user through the creation of a chat session on both the user device and agent device that enable direct communication between the user and agent. In some embodiments, the engagement server can initiate another form of initiation, such as providing specific content like an advertisement.

FIG. 1 illustrates an exemplary analytic-driven engagement system 100, which includes a user device 101, a web server 103, a network 107, an engagement server 111, an engagement database (DB) 113, an agent device 115, third-party servers 121A-121B, and third-party databases 123A-123B. The user device 101 includes a web browser 102 that connects to the web server 103. The web browser 102 can also include a tag 104. In the illustrative embodiment, the user device 101 is in communication with the web server 103, while the engagement server 111 is in communication with the engagement DB 113 and the agent device 115. In some embodiments, the engagement server 111 can enable communication between the user device 101 and the agent device 115 through the tag 104 in the web browser 102 (e.g., the tag 104 determines an engagement rule is satisfied, and sets up a chat session between the user of the user device 101 and the agent device 115 through the engagement server 111). In some embodiments, the engagement server 111 can receive information from the tag 104 via the web server 103 and the network 107, where the web server 103 and the network 107 relay the information between the engagement server 111 and the tag 104 (e.g., as illustrated by connection 117).

Network 107 can be, for example, a packet-switching network that is able to forward packets to other devices based on information included in the packet. The network 107 can provide, for example, phone and/or Internet service to various devices like the user device 101 and the agent device 115 in communication with the network 107.

The engagement server 111 can be, for example, a single web server with a processor and memory. In some embodiments, the engagement server 111 can include multiple web servers connected directly or through the network 107. For example, the agent or agent company can improve brand management and/or customer service by connecting its agents with its customers (or users) at what it deems opportune times (e.g., as defined by the engagement rules). Advantageously, the engagement server 111 can receive user interaction data from a particular user device 101 (e.g., from tag 104) and use various engagement rules to determine when to engage with user device 101 (e.g., to initiate an engagement between an agent and a user via the agent device 115 and the user device 101). In some embodiments, the engagement server 111 can retrieve other data, such as user analytics stored in engagement database (DB) 113 to form and/or modify its engagement rules. The engagement server 111 can also store the engagement rules in the engagement database 113. In some embodiments, the engagement server 111 can retrieve one or more third-party analytics, such as third-party analytic reports, from third party databases 123A-123B via third-party servers 121A-121B when forming and/or modifying the stored engagement rules. The engagement server 111 can also provide other software to both the user device 101 and the agent device 115. For example, the engagement server 111 can provide chat software to the user device 101 and the agent device 115 to facilitate a chat session between the user device 101 and the agent device 115.

Engagement database (DB) 113 can be a database in communication with the engagement server 111 that can provide user analytics to the engagement server 111. In some embodiments, the engagement DB 113 can be in communication with the engagement server 111 through a direct connection. In other embodiments, the engagement DB 113 can be in communication with the engagement server 111 through the network 107. In some embodiments, the engagement database 113 stores the engagement rules. In some embodiments, the engagement DB 113 can store web analytics received by the engagement server 111. In some embodiments, the engagement DB 113 can accumulate and store user interaction data the engagement server 111 received from a plurality of user devices 101 over time. In some embodiments, the engagement DB 113 can store statistical models form by the engagement server 111. The engagement server 111 can access the engagement DB 113 when forming and updating engagement rules, statistical models, and accumulated user interaction data. The engagement server 111 can use information stored in the engagement DB 113 with other information, such as third-party web analytics retrieved from other sources when forming or modifying engagement rules and/or statistical models.

Third-Party databases (DBs) 123A-123B can be one or more databases in communication with the engagement server 111 through the network 107 and third-party servers 121A-121B. Each of the third-party servers 121A-121B can be, for example, a single web server with a processor and memory that are controlled by a party other than the user or agent. Third-party DBs 123A-123B can accumulate and store web analytics, which the engagement server 111 can access when forming and modifying its engagement rules and/or statistical models. In some embodiments, the web analytics stored in the third-party DBs 123A-123B can be static web analytic reports. In other embodiments, the third-party DBs can include web analytic reports that are consistently updated by the third-party. In some embodiments, the engagement server 111 can access the static and/or updated web analytic reports stored in one or more of the third-party DBs when forming and modifying its engagement rules, or when forming and modifying its statistical models. For example, the engagement server 111 can connect to the first third-party DB 123A to retrieve a static third-party report, connect to the second third-party DB 123B to retrieve an updated third-party report, and/or connect to the engagement DB 113 to retrieve accumulated user interaction data to form a statistical model for the user.

In some embodiments, the statistical model can be generated using partial-least-squares projections to latent structures, (PLS), principal component analysis (PCA), or a combination of PLS and PCA. Further details of PCA and PLS analysis can be found in "Multi- and Megavariate Data Analysis, Part I, Basic Principles and Applications", Eriksson et al, Umetrics Academy, January 2006, and "Multi- and Megavariate Data Analysis, Part II, Advanced Applications and Method Extensions", Eriksson et al., Umetrics Academy, March 2006, the entirety of which are herein incorporated by reference.

PLS is a multivariate analytical tool commonly used to analyze data. PLS is a method for relating two data matrices, X and Y, to each other by a linear multivariate model. In its simplest form, a linear model specifies the relationship between a dependent or response variable y, or a set of response variables Y, and a set of predictor variables X's. For example, the response variable y is a user-specified quality for irregular objects, and the predictor variables X are the measured data for the irregular objects.

A PLS component includes a vector of X-scores t, Y-scores u, weights w and c, and loadings p. PLS components of a PLS model are traditionally calculated using the nonlinear iterative partial least squares (NIPALS) algorithm. There are many variations on the NIPALS algorithm, which consist of a matrix-vector multiplication (e.g., X'y) to generate the weight vector w. The matrix-vector multiplication is computed through a set of vector-vector multiplications $x_k'xy$, to result in scalar results $w_k$.

PLS can be represented graphically. For example, consider a regression application with N observations, 3 X-variables (factors/predictors), and 1 y-variable (response). Here, the dimensions of the X matrix are 3 columns by N observations, and the dimensions of the Y matrix is 1 column by N observations. Because there are two matrices, each row (or each observation of the N observations) corresponds to two points; one point on the X-space for the X matrix and one in the Y-space for the Y matrix. When the data table is graphed for all N observations, there is a cluster of N points in the X-space and a cluster of N points in the Y-space. The first PLS component is a line, or vector, in the X-space which approximates the cluster of points and provides a good correlation with the y-vector. Upon computing the first PLS component, the coordinate of an observation i along the first component vector can be obtained by projecting the sample onto the line to achieve the score $t_{i1}$ of observation i. The scores of all the observations form the first X-score vector $t_1$. A model estimate of y can be determined by multiplying $t_1$ by the weight of the y-vector $c_1$:

$$\hat{y}_{(1)} = c_1 t_1 \qquad \text{Equation 1}$$

where:
$\hat{y}_{(1)}$ is an estimate of y after one PLS model component;
$c_1$ is the weight of the y-vector; and
$t_1$ is the first X-score vector.

Usually, one PLS component is insufficient to adequately model the variation in the y-data. A second PLS component is used to expand on the PLS model. The second PLS component is also a line in the X-space, which passes through the origin and is orthogonal to the first PLS component. After computing the second PLS component, a second score vector $t_2$ is achieved, as well as weights $c_2$ and $w_2$:

$$\hat{y}_{(2)} = c_1 t_1 + c_2 t_2 \qquad \text{Equation 2}$$

where:
$\hat{y}_{(2)}$ is an estimate of y after two PLS model components;
$c_1$ is the weight of the first y-vector;
$t_1$ is the first X-score vector;
$c_2$ is the weight of the second y-vector; and
$t_2$ is the second X-score vector.

This PLS component generation process is repeated until reaching the desired number of components for the PLS model. Additionally, this can be performed with a single response y or multiple responses Y.

The vector-vector multiplications of the NIPALS algorithm produce similar results to a least squares estimation of a slope of a line through the origin $b=(x'y)/(x'x)$, where x'x is a constant. Further, partial averages of the sorted data set divided into three portions gives a good estimate of $b=(yy_3-yy_1)/(xx_3-xx_1)$, where the average of the highest third of y is $yy_3$, the average of the lowest third of y is $yy_1$, the average of the highest third of x is $xx_3$, and the average of the lowest third of x is $xx_1$. While partial averages can be a good estimate of b, partial averages can be affected by outside tails of the distribution. Further, computation of PLS components is limited based on the amount of memory available in the processing system. With large amounts of data storage becoming available at lower prices, the size of data sets are becoming increasingly larger than the computer memory available in the processing system. Consequently PLS processing of large data sets becomes time consuming. Further, standard PLS deflates both the X and Y matrices to speed up the computation with constant vector subtractions.

PCA is a multivariate projection method designed to extract and display the systematic variation in a data matrix X, revealing groups of observations, trends, and outliers. Data matrix X is a matrix of data with N rows (observations) and K columns (variables). The observations can be, for example, analytical samples, chemical compounds or reactions, process time points of a continuous process, batches from a batch process, biological individuals, trials of a DOE-protocol, and other measurements. To characterize the properties of the observations, variables are measured. The variables can be, for example, of spectral origin, of chromatographic origin, or measurements from sensors in a process (e.g., temperatures, flows, pressures, curves, etc.).

In some embodiments, the data are pre-processed (e.g., through scaling and mean-centering, described in further detail below). Once pre-processed (if at all), the first principal component (PC1) is computed, which is the line in the K-dimensional space that best approximates the data in the least squares sense. The line goes through the average point, and each observation can be projected onto the line to calculate the observation's score. The model can be extended with additional principal components. Usually, one principal component is insufficient to model the systematic variation of a data set. The second principal component, for example, is also represented by a line in the K-dimensional space which is orthogonal to the first PC. The line also passes through the average point, and improves the approximation of the X-data as much as possible.

To determine which variables are responsible for the patterns seen among the observations, the principal component loadings are analyzed, which are vectors called $p_1$ and $p_2$. Geometrically, the principal component loadings express the orientation of the model plane in the K-dimensional variable space. The direction of PC1 in relation to the original variables is given by the cosine of the angles for each variable. For example, for three variables, the direction is given by $a_1$, $a_2$, and $a_3$. These values indicate how the original variables (e.g., $x_1$, $x_2$, and $x_3$ for a three variable matrix) load, or contribute to, PC1. A second set of loading coefficients expresses the direction of PC2 in relation to the original variables.

By using PCA a data table X is modeled as:

$$X = 1 * \bar{x}' + T*P' + E \quad \text{Equation 3}$$

where:
$1*\bar{x}'$ represents the variable averages after pre-processing the data, if any;
$T*P'$ models the structure; and
E contains noise.

The principal component scores are the columns of the score matrix T (e.g., $t_1$, $t_2$, and $t_3$ for first, second, and third components). These scores are the coordinates of the observations in the model. The scores can be sorted in descending importance (e.g., $t_1$ explains more variation than $t_2$). As discussed above, the meaning of the scores is given by the loadings, which build up the loading matrix P (e.g., loadings of the first, second, and third components are $p_1$, $p_2$, and $p_3$. The loadings demonstrate the magnitude (e.g., large or small correlation) and the manner (e.g., positive or negative correlation) in which the measured variables contribute to the scores.

In some embodiments, the data matrices are preprocessed before performing PCA and/or PLS. For example, when using PLS, one or more of the matrices (e.g., matrix X and/or matrix Y) are transformed, centered, and/or scaled by a pre-processing method. Similarly, prior to PCA, the data can be pre-treated into a form suitable for analysis (e.g., to reshape the data such that important assumptions are better fulfilled). PLS modeling works best when the data are generally symmetrically distributed and have a generally constant error variance. Variables that vary more than ten-fold can be logarithmically transformed before the analysis to remove undesired behavior. Transforming variables can improve the predictive power and interpretability of a multivariate model. For example, a dataset which includes measurements that are outliers may unduly influence model building. Manipulating such measurements in some way prior to data analysis prevents the measurements from exerting a large influence on the model, causing the measurements to dominate over the other measurements. For example, outliers can be removed to minimize the effect that the measurements would have on the model.

To give variables (i.e., columns) of a matrix relatively or approximately equal weight in the subsequent analysis, the data can be column-wise transformed, scaled, and/or centered. Transformations of variables are often used to give them a more symmetrical distribution. For example, logarithmic transformations, negative logarithm scaling, logit scaling, square root scaling, fourth root scaling, inverse scaling, or power transformation scaling can be used.

For many types of data, centering and scaling are intertwined. Centering corresponds to a subtraction of a reference vector, where scaling the variables involves multiplying the variables by a scaling vector. The choice of scaling vector is crucial. In situations where variables of different origin and numerical range are encountered the scaling vector is usually chosen as the inverse spread of the variables. In other situations, such as with process data, the scaling vector may be defined relative to a tolerable spread in the variables.

A scaling vector is a representation of a number of observations on a line such that the positioning of the points is related in some mathematical sense to one or more criteria relevant to the observations. The scaling process involves regulating the length of a coordinate axis in variable space according to a predetermined criteria (e.g., that the length of each coordinate axis be set to the same variance). A common technique for scaling data is referred to as "unit variance," "UV" scaling, or "auto-scaling." Unit variance scaling involves calculating a standard deviation for a particular variable from a data set. A scaling weight is calculated as the inverse of the standard deviation. Each value of the variable is multiplied by the scaling weight to determine the scaled variable. After all of the variables in the data matrices have been scaled, each of the variables (i.e., coordinate axes) have unit variance.

In FIG. 1, The web server 103 can be, for example, a single web server with a processor and memory. In other embodiments, the web server 103 can be a plurality of web servers configured to provide web services to a user device 101. The website can provide tag 104 along with website code (e.g., HTML code), comprising code (e.g., JavaScript code) that, when executed by the web browser 102 on the user device 101, monitors user activity of an associated website displayed in the web browser 102. In some embodiments, instead of or in addition to the tag 104, the website provided by the web server 103 can provide an application programming interface (API) that facilitates monitoring user activity, such as the monitoring of keywords in messages, or other data used within the website (e.g., which can be viewed by the user device 101). The API can be an interface implemented by the website that enables other software programs to interact with the website. In some embodiments, the web server 103 can provide a same website viewed on both the user device 101 via the web browser 102 and the agent device 115 (e.g., via a web browser on the agent device 115, not shown). In such instances, the website viewed on the agent device 115 and user device 101 may not be identical.

The user device 101 can be computing devices with a processor and memory that can interact with the website through its web browser 102. For example, the user device 101 can include desktop computers, laptop computer, tablet computers, and/or mobile phones connected to the network 107. A user of the user device 101 can use the user device 101 to connect to the website provided by the web server 103 and can be engaged with an agent device (e.g., agent device 115) through the engagement server 111.

The web browser 102 can be software used by the user device to connect to other devices through the network 107. In some embodiments, the user device can be connected to the web server 103 before connecting to the network 107. In other embodiments, the web server 103 can be connected to the user device 101 through the network 107.

Tag 104 can be a coded tag, such as an HTML tag, that can be included in a web page the web server 103 provides to the user device 101 through the web browser 102. In some embodiments, the tag 104 can be a tag module stored in the memory of the user device 101 that communicates with the web server 103 and/or the engagement server 111 via the connection 117. For example, when the user causes the web browser 102 to load the web page, the web browser 102 processes the tag 104, which causes the web browser 102 to download default tag code (e.g., a JavaScript code file) from the web server 103. In some embodiments, the engagement server 111 can provide the default tag code to the web browser 102. The web browser 102 can receive, process, and execute the default tag code to generate the tag. The default tag code can contain code/instructions that monitor and transmit information indicative of the user's interaction with the web page (e.g., user interaction data) to the web server 103, the engagement server 111, or both. For example, the user interaction data can include mouse clicks, form entries, and Uniform Resource Locator (URL) history. Combinations of one or more user interactions can trigger actions by the engagement server 111, which is described below with reference to FIGS. 2 and 3.

Agent device 115 can be computing devices with a processor and memory that can connect to the engagement server 111 and can be in communication with the user device 101. For example, the agent device 115 can include desktop computers, laptop computers, tablet computers, and/or mobile phones connected to the network 107. The agent using the agent device 115 can use the agent device 115 to connect to the user device through an engagement (e.g., chat, video chat, phone chat, etc.) initiated by the engagement server 111. Once engagement is initiated, the agent device 115 and user device 101 can be in communication with each other through the network 107. This can allow, for example, engagement between the agent and user through interactions such as a live chat session.

Figure 2:
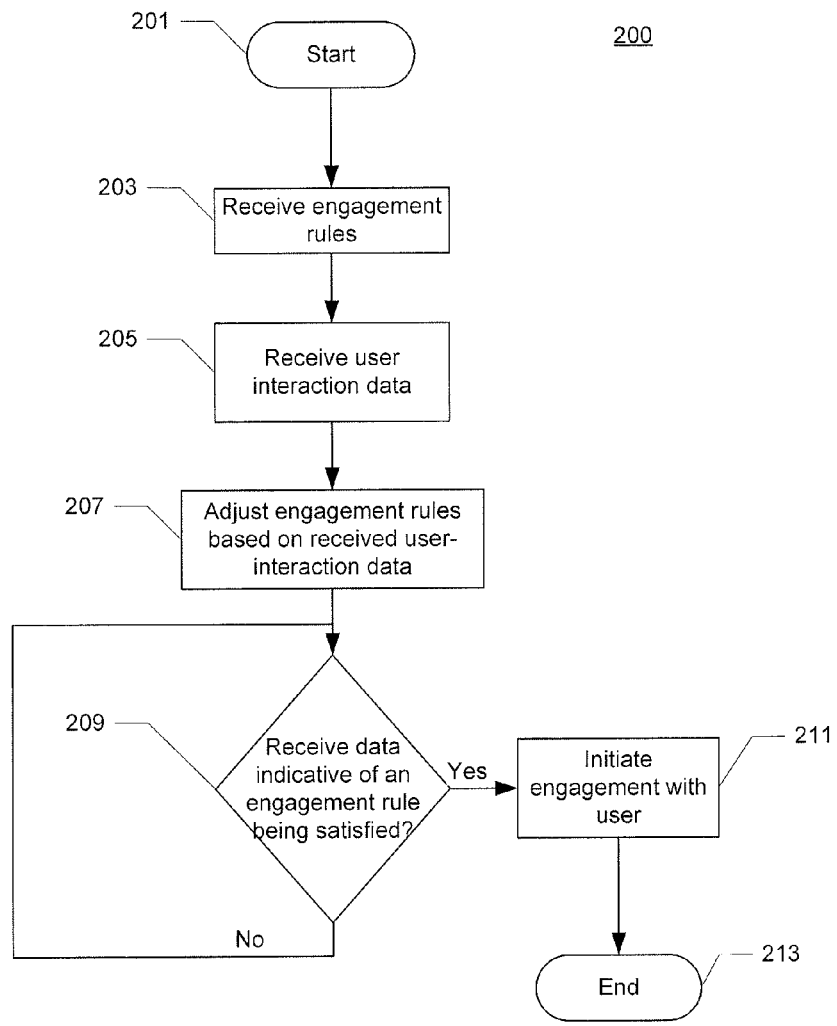
FIG. 2 illustrates a flowchart of an exemplary method of initiating engagement.

FIG. 2 illustrates a flowchart of an exemplary method 200 for initiating engagement with a user (e.g., a user browsing a website). For example, the engagement server 111 can run method 200 to determine whether to connect the agent device 115 to the user device 101. Method 200 starts at step 201 and proceed to step 203, where the engagement server 111 receives and stores engagement rules (e.g., receives and stores them in engagement DB 113). These engagement rules can be rules for determining when (e.g., based on certain user interactions with a website, based on the passage of a preconfigured amount of time, etc.) to connect the agent device 115 to the user device 101 for direct engagement (or mediated engagement), or for the web server 103 or the engagement server 111 to provide specific content to the user device 101 (e.g., a coupon, a targeted advertisement, etc.). For example, an engagement rule can be configured such that the engagement server 111 initiates a chat session between the agent device 115 and the user device 101 when the user device 101 has been idle on the same web page within a website for a specified period. In some embodiments, the engagement rule can be generated based on previous third-party analytics. For example, the engagement server 111 can retrieve one or more third-party analytic reports from third-party databases 123A-123B, which can indicate that users have a higher bounce rate once they reach a specific web page (e.g., a "FAQ" or "Help" web page). The engagement server 111 can then create and store an engagement rule that includes a shortened timer when a user device 101 is visiting one of these specific, "high-bounce" web pages.

The engagement server 111 can then proceed to step 205, where it receives user interaction data from the user device 101. For example, the tag 104 included in the user device 101 (e.g., downloaded from web server 103) can track and record user interaction data within the web browser 102. In some embodiments, the tag 104 sends the user interaction data to the web server 103, which can then send the user interaction data through the network 107 to the engagement server 111. In some embodiments, the tag 104 sends the user interaction data directly to the engagement server via connection 117. In some embodiments, the tag 104 can send the user interaction data to the engagement server 111 in packets at standard intervals, where the engagement server 111 can accrue the packets of data. In other embodiments, the tag 104 can wait for triggers to send user interaction data to the engagement server 111. This can, for example, help reduce the volume of user interaction data sent to the engagement server 111.

After receiving the user interaction data, the engagement server 111 can then proceed to step 207, where it can adjust the engagement rules. In some embodiments, the engagement server 111 can adjust the previously-stored engagement rules to, for example, trigger based on different conditions. For example, the engagement server 111 in step 205 may receive user interaction data that indicates that the user is spending longer-than-average times on each webpage before traversing to another page within the website. The engagement server 111 can then adjust engagement rule to have a longer trigger time so that the engagement server 111 initiates an engagement between the agent device 115 and the user device 101 after a longer period (e.g., to prevent initiating an engagement before a user may need help).

In step 209, the engagement server 111 determines whether it has received data indicative of an engagement rule being satisfied. In some embodiments, the engagement server 111 can monitor the user interaction data received in step 205 and compare the user interaction data against a plurality of engagement rules, initiating an engagement between the agent device 115 and the user device 101 when the conditions of any of the plurality of engagement rules is satisfied. For example, the engagement server 111 can be using an engagement rule that waits until a user has been on a specific web page (e.g., an FAQ page) for at least a specified duration. When the engagement server 111 reviews the received user interaction data to determine that the user has been on the specific web page for longer than the specified duration, the engagement server may then proceed to step 211 and initiate an engagement between with user device 101 (e.g., present the user device 101 with a popup, set up a service session between the user device 101 and the agent device 115 (e.g., a chat session, a video session, etc.), etc.). Otherwise, the engagement server 111 can loop back to step 209 (e.g., to analyze newly received user interaction data) to determine whether any of its engagement rules have been satisfied.

In step 211, the engagement server 111 can initiate an engagement with the user. For example, the engagement server 111 can initiate a chat session between the agent and the user via the agent device 115 and the user device 101. In some embodiments, the engagement server 111 can initiate an engagement with the user through other means, such as providing additional text or video instructions based on the engagement rule satisfied. For example, the engagement server 111 can monitor an engagement rule regarding a user comparing two or more similar products. Once the engagement server 111 determines that the comparison engagement rule has been satisfied, the engagement server 111 can provide a stored video comparison of the two or more products. In some embodiments, the engagement server can use other means through JavaScript and HTML to engage with the user device 101. This can include, for example, providing to the web browser 102 a banner, a tool-tip, hover-over text, and similar methods to provide more information to the user. Once the engagement has been initiated, the engagement server 111 can stop method 200 at step 213.

Figure 3:
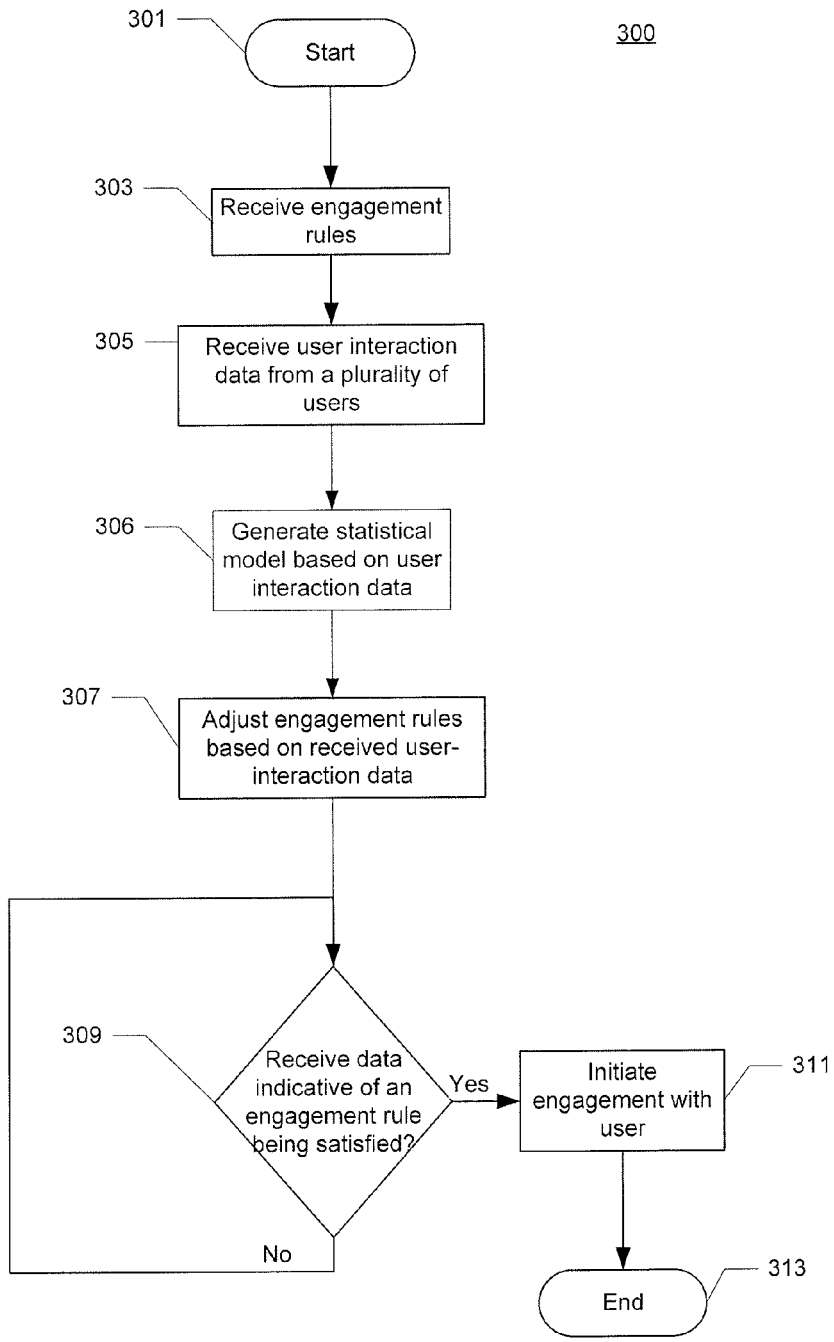
FIG. 3 illustrates a flowchart of another exemplary method of initiating engagement.

FIG. 3 illustrates a flowchart of another exemplary method of initiating engagement. Similar to the method 200 (e.g., implemented by the engagement server 111), the engagement server 111 can implement method 300 to incorporate web analytics from various sources along with received user interaction data to determine whether to initiate an engagement with the user device 101. Method 300 begins at step 301 and proceeds to step 303, where the engagement server 111 receives and stores one or more engagement rules. Similar to step 203, the engagement server 111 can receive one or more engagement rules that may indicate when to initiate an engagement with the user device 101 and the agent device 115. In some embodiments, the engagement server 111 can incorporate one or more third-party analytics, such as multiple third-party analytic reports, from one or more third-party databases 123A-123B via third-party servers 121A-121B.

In step 305, the engagement server 111 can receive user interaction data from a plurality of user devices similar to the user device 101 in FIG. 1. Similar to step 205 in method 200, the engagement server 111 can receive data that indicates how a particular user is interacting with the site. In step 305, the engagement server 111 can receive user interaction data from a plurality of user devices 101, such as simultaneously receiving data from multiple user devices 101 in parallel. In some embodiments, the engagement server 111 can accumulate the user interaction data from the plurality of users and store this data for later use. The engagement server 111 can track different data for different individual users; this data may still be used together by the engagement server 111 in later use.

The engagement server 111 can then proceed from step 305 and proceed to step 306, where the engagement server 111 generates a statistical model based on the accumulated user interaction data. In some embodiments, the engagement server can use various third-party analytics received from the plurality of third-party databases 123A-123B, in addition to stored user interaction data and the user interaction data received in step 305. The engagement server 111 can form the statistical model to create a "model" user profile, for example, that can represent the expected actions of a typical, default user. In such instances, the engagement server 111 bases its engagement decisions on the default statistical profile that can be constantly updated as the engagement server 111 receives new user interaction data. In some embodiments, the engagement server 111 can use the statistical model to form a plurality of user profiles that it may use to model each of the plurality of user devices for which it is receiving user interaction data.

After creating the statistical model, the engagement server 111 can then proceed to step 307, where it can adjust the engagement rules based on the received user interaction data. In some embodiments, the engagement server 111 can use the user interaction data to adjust the engagement rules. In other embodiments, the engagement server 111 can first use the statistical model to adjust the engagement rules and subsequently use the user interaction data to further adjust the engagement rules. The engagement server 111 may act in a similar manner to that of step 207, as the engagement server 111 can use the user interaction data along with the statistical model to modify the previously received and stored engagement rules so that the engagement server 111 initiates an engagement between the agent device 115 and the user device 101 at more opportune times.

In order to determine whether it is an opportune time to initiate an engagement between the user device 101 and the agent device 115, the engagement server 111 may proceed to step 309, where the engagement server 111 determines whether it has received user interaction data from a user device 101 indicative of any of the engagement rules being satisfied. In some embodiments, the engagement server 111 can constantly monitor multiple user devices 101 and can determine whether one of the plurality of user devices 101 satisfied its conditions for engagement. If not, the engagement server 111 can loop back to step 309 and wait until a condition is satisfied.

When a condition is satisfied, the engagement server 111 can proceed to step 311, where the engagement server 111 initiates an engagement with the user device 101. Similar to step 211, the engagement server 111 can initiate direct communication, such as, for example, a text or video chat session, between an agent and user via the agent device 115 and the user device 101. Once the engagement server 111 successfully initiates an engagement with the user device 101, it may proceed to step 313 and end method 300.

The above-described computerized methods and apparatuses can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computerized method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

We claim:

1. A computer-implemented method comprising:
accessing a set of engagement rules defined based on data representing interactions with a website, wherein each of the engagement rules defines conditions for providing web-based content;
accessing historical interaction data representing previous interactions with the website, the previous interactions made at a communications device;
accessing an analytic report representing trends in internet usage amongst a group of website visitors;
generating a statistical model based on the historical interaction data and the analytic report, wherein, when the statistical model is generated using principal component analysis, the historical interaction data is modeled as:

$$X = 1*\bar{x}' + T*P' + E,$$

wherein:
$1*\bar{x}'$ represents variable averages or percentile values after pre-processing the historical interaction data;
$T*P'$ models a structure; and
E contains noise;
accessing data representing an ongoing visit to the website, the ongoing visit occurring at the communications device, wherein accessing data representing an ongoing website visit includes:
making a classification decision by classifying the ongoing website visit using the statistical model; and
updating an engagement rule of the set based on the classification decision;
accessing additional data representing the website visit, wherein accessing the additional data includes determining that the additional data satisfies a condition defined by the updated engagement rule; and
initiating an engagement on the website, in response to determining that the additional data satisfies the condition defined by the updated engagement rule.

2. The method of claim 1, wherein the historical interaction data is generated by a tag module operating on the first communications device.

3. The method of claim 1, wherein the engagement includes a chat conversation involving the computing device.

4. The method of claim 1, wherein the method is performed by an engagement server.

5. The method of claim 1, wherein accessing the analytic report includes obtaining the analytic report from a third-party database.

6. The method of claim 1, wherein at least one of the conditions is defined with respect to time spent interacting with a website.

7. A system comprising:
a processor configured to:
access a set of engagement rules defined based on data representing interactions with a website, wherein each of the engagement rules defines conditions for providing web-based content;
access historical interaction data representing previous interactions with the website, the previous interactions made at a communications device;
access an analytic report representing trends in internet usage amongst a group of website visitors;
generate a statistical model based on the historical interaction data and the analytic report, wherein, when the statistical model is generated using principal component analysis, the historical interaction data is modeled as:

$$X = 1 * \bar{x}' + T*P' + E,$$

wherein:
$1*\bar{x}'$ represents variable averages or percentile values after pre-processing the historical interaction data;
$T*P'$ models a structure; and
E contains noise;
access data representing an ongoing visit to the website, the ongoing visit occurring at the communications device, wherein accessing data representing an ongoing website visit includes:
making a classification decision by classifying the ongoing website visit using the statistical model; and
updating an engagement rule of the set based on the classification decision;
access additional data representing the website visit, wherein accessing the additional data includes determining that the additional data satisfies a condition defined by the updated engagement rule; and
initiate an engagement on the website, in response to determining that the additional data satisfies the condition defined by the updated engagement rule.

8. The system of claim 7, wherein the historical interaction data is generated by a tag module operating on the first communications device.

9. The system of claim 7, wherein the engagement includes a chat conversation involving the computing device.

10. The system of claim 7, wherein the method is performed by an engagement server.

11. The system of claim 7, wherein accessing the analytic report includes obtaining the analytic report from a third-party database.

12. The system of claim 7, wherein at least one of the conditions is defined with respect to time spent interacting with a website.

13. A computer-program product tangibly embodied in a non-transitory machine-readable storage medium having instructions stored thereon, the instructions operable to cause a data processing apparatus to perform operations including:
accessing a set of engagement rules defined based on data representing interactions with a website, wherein each of the engagement rules defines conditions for providing web-based content;
accessing historical interaction data representing previous interactions with the website, the previous interactions made at a communications device;
accessing an analytic report representing trends in internet usage amongst a group of website visitors;
generating a statistical model based on the historical interaction data and the analytic report, wherein, when the statistical model is generated using principal component analysis, the historical interaction data is modeled as:

$$X = 1 * \bar{x}' + T*P' + E,$$

wherein:
$1*\bar{x}'$ represents variable averages or percentile values after pre-processing the historical interaction data;
$T*P'$ models a structure; and
E contains noise;
accessing data representing an ongoing visit to the website, the ongoing visit occurring at the communications device, wherein accessing data representing an ongoing website visit includes:
making a classification decision by classifying the ongoing website visit using the statistical model; and
updating an engagement rule of the set based on the classification decision;
accessing additional data representing the website visit, wherein accessing the additional data includes determining that the additional data satisfies a condition defined by the updated engagement rule; and
initiating an engagement on the website, in response to determining that the additional data satisfies the condition defined by the updated engagement rule.

14. The method of claim 13, wherein the historical interaction data is generated by a tag module operating on the first communications device.

15. The method of claim 13, wherein the engagement includes a chat conversation involving the computing device.

16. The method of claim 13, wherein the method is performed by an engagement server.

17. The method of claim 13, wherein accessing the analytic report includes obtaining the analytic report from a third-party database.

18. The method of claim 13, wherein at least one of the conditions is defined with respect to time spent interacting with a website.

* * * * *